(12) United States Patent
Vanderpan

(10) Patent No.: US 6,378,175 B1
(45) Date of Patent: Apr. 30, 2002

(54) RESILIENT FASTENING CLIP FOR PLANTS

(75) Inventor: Ronald D. Vanderpan, San Jose, CA (US)

(73) Assignee: Doorframer, Inc., Pacific Grove, CA (US)

( * ) Notice: Subject to any disclaimer, the term of this patent is extended or adjusted under 35 U.S.C. 154(b) by 0 days.

(21) Appl. No.: 09/463,919

(22) PCT Filed: Jul. 30, 1998

(86) PCT No.: PCT/US98/15906

§ 371 Date: Dec. 21, 1999

§ 102(e) Date: Dec. 21, 1999

(87) PCT Pub. No.: WO99/05900

PCT Pub. Date: Feb. 11, 1999

Related U.S. Application Data

(60) Provisional application No. 60/054,447, filed on Aug. 1, 1997, and provisional application No. 60/083,246, filed on Apr. 27, 1998.

(51) Int. Cl.$^7$ .............................................. A01G 17/08
(52) U.S. Cl. .............................. 24/336; 24/339; 24/545; 24/562; 47/44; 47/46
(58) Field of Search ................................. 47/44, 46, 47, 47/30, 26, 45, 67, 41.01, 41.15; 24/336, 337, 339, 375, 343, 346, 349, 370, 545, 531, 555, 562, 129 R; 248/74.2, 316.7

(56) References Cited

U.S. PATENT DOCUMENTS

| | | |
|---|---|---|
| 3,739,525 A | 6/1973 | Rybak |
| 3,800,365 A | 4/1974 | Bruggart |
| 3,983,602 A | 10/1976 | Barry |
| 4,050,187 A | 9/1977 | Geiger et al. |
| 4,099,299 A | 7/1978 | Bruggert et al. |
| 4,201,013 A | 5/1980 | Robbins |
| 4,615,140 A | 10/1986 | Frano |
| 4,620,389 A | 11/1986 | Coulson |
| 5,052,086 A | 10/1991 | Nasuno |
| 5,056,198 A | 10/1991 | Viglione |
| 5,167,091 A | 12/1992 | Schroeder |
| 5,210,973 A | 5/1993 | Kratky et al. |
| 5,463,189 A | 10/1995 | Deneke et al. |
| 5,542,209 A | 8/1996 | Sheu |

FOREIGN PATENT DOCUMENTS

| | | | |
|---|---|---|---|
| FR | 2232988 | * | 1/1975 |
| FR | 2247157 | * | 5/1975 |
| JP | 5-3728 | * | 1/1993 |

* cited by examiner

*Primary Examiner*—James R. Brittain
(74) *Attorney, Agent, or Firm*—Gray Cary Ware & Freidenrich LLP

(57) ABSTRACT

A resilient fastening clip (10) for attaching a plant member (22) to a portion of a support structure includes a clip wall (24) that creates a first enclosure (12) and a second enclosure (14) which are integrally fashioned from the clip wall (24). The first enclosure (12) has a first enclosure entry mouth (16), and the second enclosure (14) has a second enclosure entry mouth (18). The first enclosure entry mouth (16) may lie either within the second enclosure (14), or may be external to it. A flexible arm (34) is optionally provided to help capture the support wire (20). The clip (10) may also have a number of gripper protrusions (46) which prevent rotation of the plant member (22) within the second enclosure (14). An alternative preferred embodiment of a resilient clip (110) has a transverse wire channel (58) formed in the first enclosure region (12), into which a support wire (20) may be inserted. The clip (110) may also have an enlarged retaining arm (64) which divides the second closure (14) into inner (66) and outer enclosure portions (68). Another preferred embodiment of a resilient clip (210) has an enlarged first enclosure (12) that is configured to accept a trellis slat (84).

1 Claim, 7 Drawing Sheets

RESILIENT FASTENING CLIP FOR PLANTS

This application claims priority from U.S. Provisional Applications Ser. Nos. 60/054,447 filed Aug. 1, 1997 and 60/083,246, filed Apr. 27, 1998, which have the same inventor as the present application.

TECHNICAL FIELD

The present invention relates generally to fastening devices, and more particularly to a clip for attaching vines, branches, shoots and the like to a training wire or other support member.

BACKGROUND ART

The use of structures in agriculture to support plant growth is a well established practice which has applications in many types of horticulture. Certain types of plants, especially when immature, may bear fruit whose weight can break branches which are not sufficiently supported. This is true of apple trees, as well as stone fruit trees of various sorts. Grapes and tomato plants are other examples of plants which are commonly supported during some stage of their growth.

In American vineyards, grape vines are usually trained to grow on tensioned wires or trellises which are supported by vertical stakes. By training the vines, the plant is encouraged to grow according to an ordered plan which can allow more efficient use of land area. By encouraging the plants to grow on these wires, the fruit is removed from contact with the ground where it may be more susceptible to disease or rot. Harvesting is also facilitated by spreading out the plant growth in a vertical plane thus reducing clumps and tangles which may impede access to fruit.

Produce from farms that grow these types of fruits amounts to billions of dollars yearly, and literally millions of plants are raised in this manner. In order to farm these plant varieties efficiently, several factors must be considered. To grow plants using trellises and wire supports, an efficient method of attaching each plant to its support is needed. Each of these millions of plants which are grown worldwide each year must typically be attached at multiple points, thus the number of attachment devices can be very large indeed. The time required for manipulating these many devices can be quite extensive. Additionally, there may be some skill involved in attaching the plant securely, but without damaging the stalks. Thus, any device which attaches more easily and quickly can result in a major savings of time, money and effort. The ideal device would be simple to use, durable, inexpensive, and would not constrain plant growth.

Conventional attachment devices all suffer from some defect. For centuries, vines have been tied onto stakes using string or twine. This has the disadvantage that the string easily degrades under exposure to sun and rain, and takes time to tie individually.

A very common device which is often used is a "twist-tie" or a piece of wire which is wrapped around the vine and the support. Wire however may rust or degrade when exposed to the elements. It also may require some skill in judging how tightly to apply it. Additionally, bare wire may cut into the plant stalk, either initially when applied, or later when wind causes the plant to whip against its constraints. Also, the wire may constrict the plant as it increases in size, either jeopardizing that portion of the plant, or requiring the wires to be re-tied, an operation which may be more time-consuming than the initial installation. Use of wire ties may also require monitoring of the plants to ensure that constriction is not occurring, which again may be costly in time and labor.

There have been several attempts to improve upon conventional twist-ties. U.S. Pat. No. 3,800,365 to Bruggert discloses a clip for attaching stalks to wire. These appear to be limited to attaching vertical stalks to horizontal supports or vice versa. The clips appear spindly and may take some time to attach correctly. They would easily become entangled with each other in a bag, and one can imagine that a good deal of effort would be required to disentangle a batch which contains one or two hundred of these Bruggert clips.

U.S. Pat. No. 4,099,299, also to Bruggert et al., appears to be a version of the same kind of clip, but allows horizontal to horizontal attachment, or vertical to vertical. This invention also suffers from many of these same defects as the earlier version, specifically entanglement problems and attachment difficulties.

Thus there is a great need for an improved fastening clip for attaching plant vines and stalks to support wires or trellises.

DISCLOSURE OF INVENTION

Accordingly, it is an object of the present invention to provide an attachment device which is very quick and easy to apply.

Another object of the invention is to provide an attachment device which holds the plants firmly.

And, another object of the invention is to provide an attachment device which is durable, and can be reused for multiple growing seasons.

Yet another object of the present invention is to provide an attachment device which expands to accommodate plant growth without constricting the plant.

Still another object of the present invention is to provide an attachment device which is inexpensive to manufacture.

A further object of the present invention is to provide an attachment device which requires no skill to apply.

A still further object of the present invention is to provide an attachment device which does not chafe or abrade the vine or stalk of the plant.

Briefly, one preferred embodiment of the present invention is a resilient fastening clip for attaching a plant member to a portion of a support structure, such as a wire. The clip includes a clip wall that creates a first enclosure and a second enclosure which are integrally fashioned from the clip wall. The first enclosure has a first enclosure entry mouth, which may be resiliently spread open to allow entrance of a support structure portion, and which closes after insertion to prevent outward passage of the support structure portion. The second enclosure has a second enclosure entry mouth which may be resiliently spread open to allow entrance of a plant member, and which closes after insertion to prevent outward passage of said plant member. The first enclosure entry mouth may be configured to lie either within the second enclosure, or may be external to it. A flexible arm is optionally provided to help capture the support wire. The clip may also have a number of gripper protrusions which prevent rotation of the plant member within the second enclosure.

An alternative embodiment of a resilient clip has a transverse wire channel formed in the first enclosure region, into which a support wire may be inserted. This wire channel may have retaining barbs to prevent lateral movement of the clip upon the support wire. The clip may also have an enlarged retaining arm which divides the second closure into inner and outer enclosure portions. A plant stem is introduced into the inner portion of the second enclosure, and is held in place between the retaining arm and the inner surface of the clip wall. As the plant stem increases in diameter, the retaining arm is forced to pivot further and further into the outer enclosure portion. The arm may be configured with a thinner portion near the top of the pivot point, which allows the arm to twist and rise out of the plane of the clip. The tip of the arm thus can rise above the height of the clip wall and continue to rotate. This allows the plant to grow unrestricted into the full area of the second enclosure. Even after the plant's diameter has grown to fill the second enclosure area, further growth is still not restricted. The clip is able to flex, and the second enclosure can enlarge even further to accommodate the plant's growth.

Another embodiment of a resilient clip has an enlarged first enclosure that is configured to accept a trellis slat. The clip may have a key with a retaining notch that helps to confine the trellis slat within the first enclosure.

An advantage of the present invention is that it can be easily applied to both the support and the plant member, thus saving much time and money over the multiple instances which are required in a field of plants.

Another advantage of the invention is that the clip holds the plant member firmly.

And, another advantage is that the invention is constructed of rugged plastic or other durable weather resistant material which makes it reusable over the course of many seasons.

Still another advantage of the present invention is that the clip is resilient and can expand as the plant grows and develops, so that the clip does not have to be replaced as the plant increases in size. This eliminates the costs involved in replacement, and in monitoring for necessity of replacement.

A further advantage is that the clip is simple and inexpensive to manufacture using standard molding or extrusion techniques.

Yet another advantage of the present invention is that the clips are very easy to apply and require very little skill to fasten correctly.

An additional advantage of the present invention is that the walls of the clip are relatively wide compared to the gage of wires, and thus tend to abrade the stalks and vines of the plants less. The clips may be configured with retaining barbs which help to hold the plant member more securely, without damaging it.

A still further advantage of the present invention is that they are less easily entangled than some prior art inventions.

These and other objects and advantages of the present invention will become clear to those skilled in the art in view of the description of the best presently known mode of carrying out the invention and the industrial applicability of the preferred embodiment as described herein and as illustrated in the several figures of the drawings.

DESCRIPTION AND BEST MODE OF THE INVENTION

Figure 1:
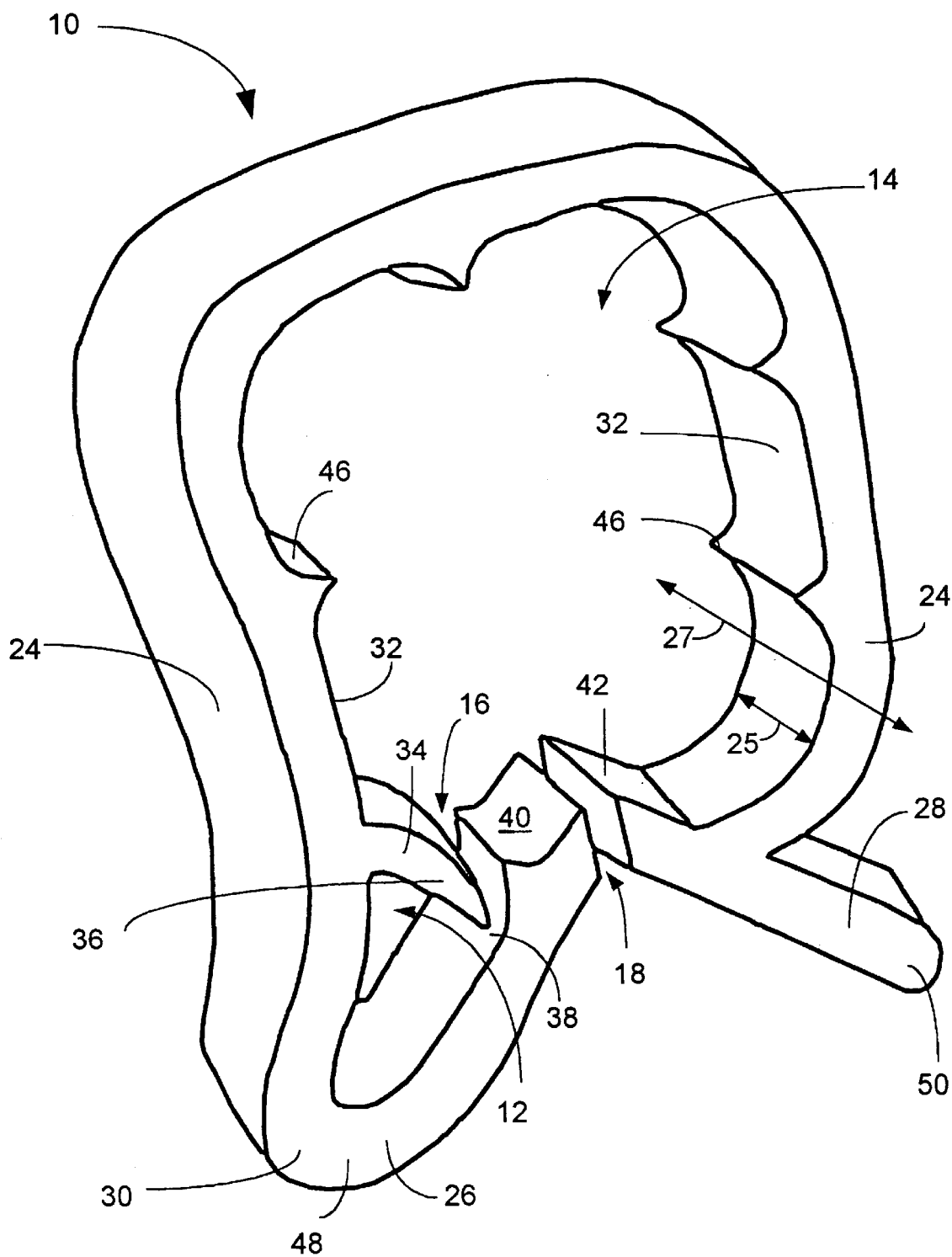
FIG. 1 is a perspective view of the fastening clip of the preferred embodiment of the present invention.

The preferred embodiment of the present invention is a resilient fastening clip for attaching a vine or branch or similar plant member to a wire, twine, trellis or stake or the like, for supporting and training the plant during growth and fruiting. The fastening clip of the preferred embodiment is particularly directed toward use in viticulture using wire support members. The clip is set forth in FIGS. 1, 2, and 3, where it is designated therein by the general reference character 10. Closely related embodiments are shown in FIGS. 4–11.

Figure 2:
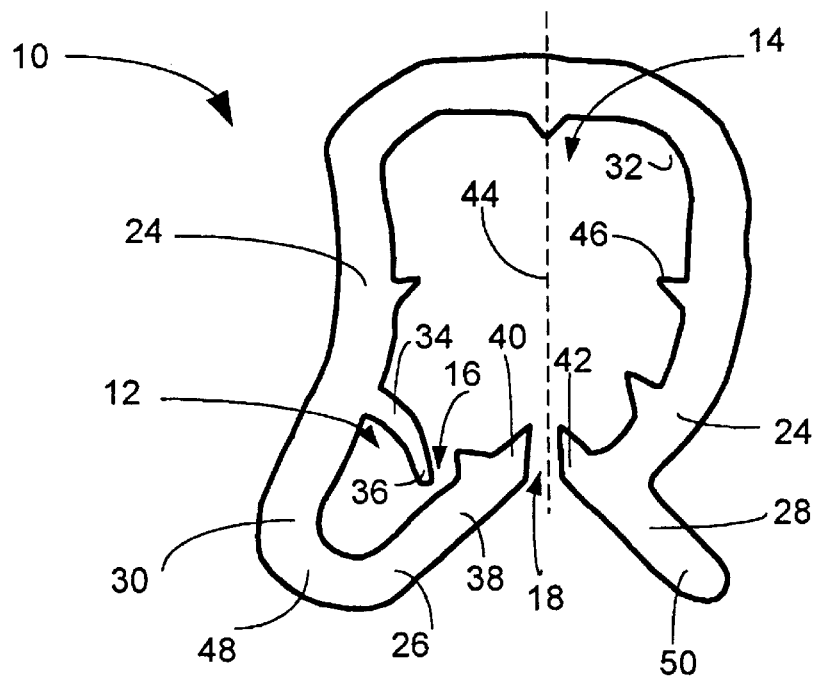
FIG. 2 is a front elevational view of the fastening clip of FIG. 1.
Figure 3:
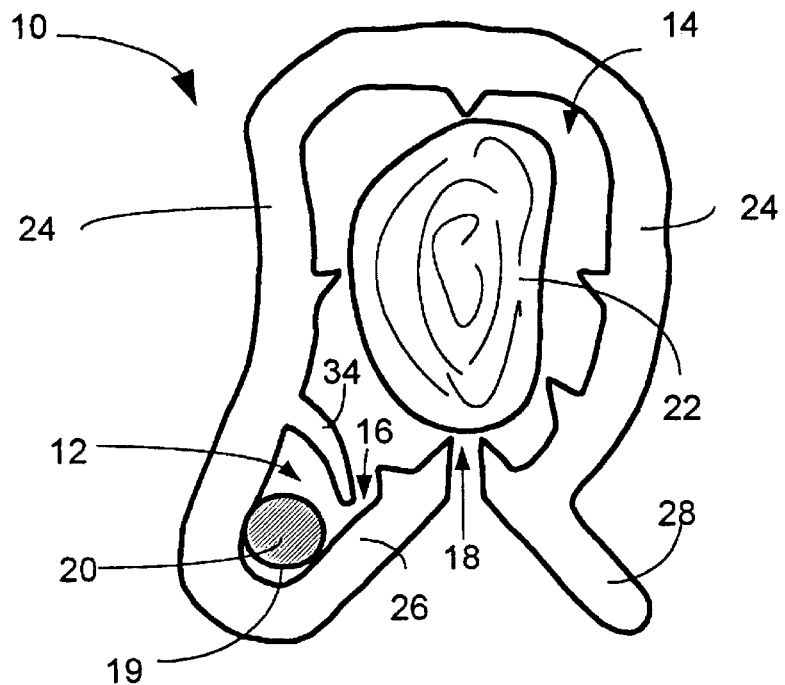
FIG. 3 is identical to FIG. 2 but with inclusion of the training wire and plant member in cross-section
Figure 4:
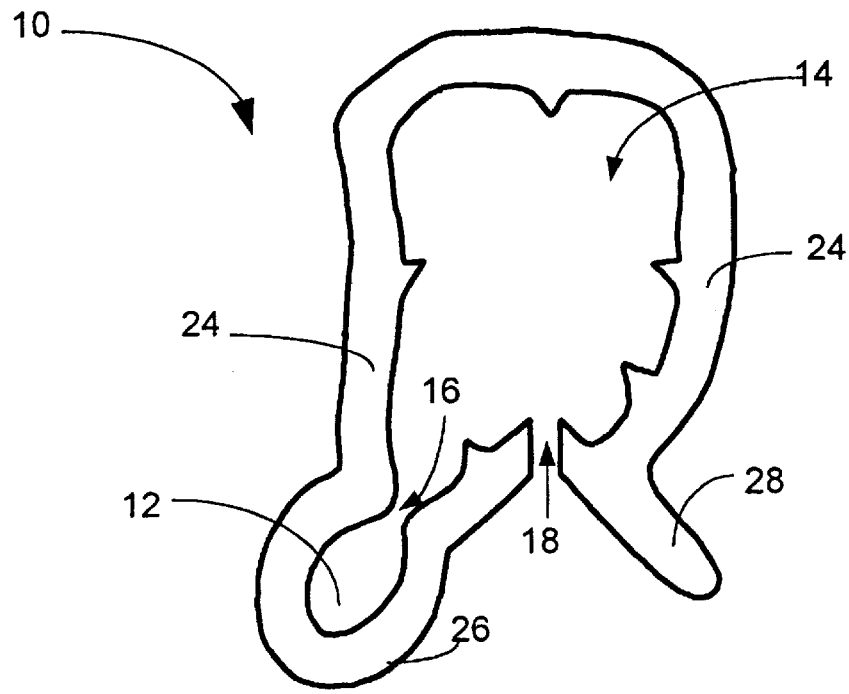
FIG. 4 is an alternative embodiment to the fastening clip of FIG. 1, wherein the arm has been omitted.

Referring to the perspective view of FIG. 1 and also to the front elevational views depicted in FIGS. 2 and 3 of the drawings, the fastening clip 10 may be generally thought to be comprised of two enclosure regions, the bounding elements of which are integrally fashioned together. Thus, present are a first enclosure 12, which in this instance is a smaller enclosure and a second enclosure 14, which in this instance is a larger enclosure. The first enclosure 12 includes an entrance or first enclosure entry mouth 16, while the second enclosure 14 includes a second enclosure entry mouth 18. As will be explained in greater detail below, the first enclosure entry mouth 16 allows for insertion of a bracing or support structure portion 19, which in this instance is a training wire 20 (see FIG. 3 where the wire 20 is shown in cross-section) into the first enclosure 12. The second enclosure entry mouth 18 permits the introduction of a plant member 22 such as a grapevine cane or fruit tree branch (again see FIG. 3 where the plant member 22 is also shown in cross-section) into the second enclosure 14. Thus, the clip 10 may be hung upon the wire 20 by the first enclosure 12 whereupon the plant member 22 may be positioned and held against the wire 20 as desired by insertion of the plant member 22 within the second enclosure 14.

With continued reference to FIGS. 1, 2, and 3, the fastening clip 10 has a continuous clip wall 24 of a resilient nature with a configuration that is seemingly circuitous. In fact, the configuration provides for both the aforementioned first and second enclosures (12 and 14) and a pair of first and second legs 26 and 28, respectively, each of which lie in the same plane as the remainder of the clip wall 24. Importantly, the configuration also affords the resilient clip wall 24 a number of flexible hinging actions for opening of both of the first and second enclosures (12 and 14). The height 25 of the clip wall 24 is shown, as well as an axis which is parallel to the height dimension, and will be thus referred to as the height axis 27.

In the especially preferred embodiment shown in FIGS. 1, 2, and 3, the first leg 26 is congruous with the first enclosure 12. That is, a closely bent arcuate section 30 of the clip wall 24 results in a structure that provides simultaneously for both a major portion of the boundary of the first enclosure 12 and which is also denoted as the first leg 26. In other embodiments, described below, such first and second legs (26 and 28) are mirror-like in appearance.

Extending inwardly from an inner surface 32 of the clip wall 24, at a location just above the arcuate section 30 and integral therewith, is an arm 34 which also lies in the common plane mentioned above and which is curved in the direction of the arcuate section 30. The arm 34, together with the arcuate section 30, completes the boundary of the first enclosure 12 for entrapment of the wire 20. Once the wire 20 is located within the first enclosure 12, it cannot easily be inadvertently dislodged by movement or thrashing of the plant member during windy conditions or harvesting but rather requires a manipulated opening of the previously-mentioned first enclosure entry mouth 16, as will be apparent from the following.

The first enclosure entry mouth 16 is found between an arm end 36 and an opposing first leg portion 38. The first enclosure entry mouth 16 affords a sufficient aperture between the arm end 36 and the opposing portion 38 such that the wire 20 may be passed therebetween to be placed within the first enclosure 12. During the introduction of the wire 20, the opposing portion 38 and, to a certain extent, the arm 34, are deflected in a resilient fashion to expand the first enclosure entry mouth 16. Where necessary, introduction of the wire 20 is assisted by using one's fingers to bend the opposing portion 38 further in the direction of the second leg 28. Thus, the first enclosure entry mouth 16, which has a static aperture size made to be smaller than the diameter of the training wire 20 used, requires that some mild force be used to cause the wire 20 to enter the first enclosure 12.

It will be apparent that the benefit of such a forced, resilient arrangement is that the first enclosure entry mouth 16 is effectively "shut" behind the wire 20, with the arm 34 then preventing escape of the wire 20 from the first enclosure 12. A one-way closure of sorts is made which is enhanced by the curved aspect of the arm 34. The arrangement simplifies the attachment of the plant member 22 by providing that a secure attachment of the fastening clip 10 to the wire 20 may be made and that step dispensed with so that the plant member 22 may then be simply inserted into the second enclosure 14 without undue manipulation, as described below. The arrangement further permits an easy displacement of the fastening clip 10 along the wire 20 (prior to introduction of the plant member 22) to simplify location of the clip 10, since the clip 10 may be slidably moved as needed without the annoyance of the clip 10 becoming inadvertently detached.

It would be apparent that rather than having a single arm 34 which extends to a location near the opposing first leg portion 38 to create a narrow aperture (i.e., the first enclosure entry mouth 16) for entry into the first enclosure 12, instead two shorter arms might extend in opposition from opposed inner surfaces of the first enclosure 12 to create such a similar aperture between those two arm ends. Further, and as shown in the alternative embodiment of FIG. 4, a design might be used in which any arms such as 34 are omitted altogether, or where at most there are mere nubbles present. Thus, the configuration of the clip wall 24 itself might be used to create a narrow, spreadable aperture by bringing together, very closely, opposed inner surfaces of the clip wall 24 at points corresponding to the base of the aforementioned arm 34 and the opposing portion 38. Neither of the alternative arrangements are presently believed to give as secure an attachment to the wire 20 as the embodiment shown in FIG. 1, however.

It should also be apparent that what is denoted as the first enclosure 12 might be made larger (even larger than the second enclosure 14) for attachment to a support member having a larger diameter or cross-section than the described wire 20, such as a vertically driven stake. The shape of the first enclosure 12 might also be modified to accommodate a rectangular or other shape of support element (a trellis member, for example).

Referring again to FIGS. 1, 2, and 3, the first and second legs (26 and 28) form an acute angle with a relation such that a first leg proximal end 40 and a similar second leg proximal end 42 are inwardly directed and come together in relatively close proximity to give rise to the aforementioned second enclosure entry mouth 18 and a vertex of sorts lying on approximately a bisection line 44 (see FIG. 2) of the second enclosure 14. The first and second legs (26 and 28) provide a mechanism by which the first enclosure entry mouth 16 can be resiliently opened for enclosure of the plant member 22. The second enclosure entry mouth 18 actually has a dual function in that, besides providing a opening to the second enclosure 14, the second enclosure entry mouth 18 also constitutes one or two of a plurality of gripper protrusions 46, which are discussed further below.

The region from a first leg distal end 48 and a second leg distal end 50 to the first and second leg proximal ends (40 and 42) creates a directing (or "funneling") and leveraging region to assist in the opening of the second enclosure entry mouth 18 as the plant member 22 is pressed into the fastening clip 10. (Note that in this embodiment, what is denoted as the first leg distal end 48 also correlates with the previously-mentioned closely bent arcuate section 30.) Because of the resilient, flexibly hinged nature of the clip wall 24, the second enclosure entry mouth 18 is correspondingly resiliently spread apart when the plant member 22 is pushed past the first and second leg distal ends (48 and 50) toward and through the second enclosure entry mouth 18. After the plant member 22 enters the second enclosure 14, the second enclosure entry mouth 18 then resiliently closes to confine the plant member 22 within the second enclosure 14. This process is comparable to that used for introduction of the wire 20 into the first enclosure 12. Workers might also again use their fingers to pull the two legs (26 and 28) apart during the introduction of the plant member 22 in order to give assistance to the forced spreading of the second enclosure entry mouth 18 by pushing contact with the plant member 22 or as an alternative thereto.

Once the plant member 22 is positioned within the second enclosure 14, it is tightly but resiliently held there by the spring-like nature of the surrounding clip wall 24. Thus, a single size of fastening clip 10 has a relatively wide range of applicability to various plant member 22 diameters. Moreover, the clip 10 has the ability to expand and "grow" in size as the plant member 22 continues its own growth. In this manner, growth of the plant is not restricted and the plant member 22 is not subjected to injury by cutting or penetration of elements of the clip 10 into the plant member 22 as its diameter increases.

The gripper protrusions 46 are spike-like structures that are integrally distributed about the inner surface 32 of the clip wall 24 and, as noted above, are also present as features of the first and second leg proximal ends (40 and 42). The gripper protrusions 46 act to prevent rotation of the plant member 22 within the clip 10. Thus, not only is the plant member 22 held in secure juxtaposition against the wire 20 at a desired point so that the plant member 22 is not scraped upon the wire 20 as it moves to and fro in the wind or during harvesting, but new growth can be easily directed and maintained in specific orientations along the wire 20 as well.

The fastening clip 10 of the preferred embodiment is of a unitary construction and molded (or extruded and cut, etc.) from any of a number of resilient materials, with the preferred material being a durable plastic. Suitable plastics may include, for example, nylon. Fillers such as glass may be incorporated into the plastic compound for stiffness and memory purposes. The fastening clip 10 might also be made from a metal, such as stainless steel, although it is generally desirable to avoid metal in the vineyard since metal contamination of the wine product could occur and impart an off taste.

For application to branches or shoots of a larger size than typical plant members 22 (for example, the branches of fruiting trees), the height 25 of the clip wall 24 might be made correspondingly greater, in addition to increasing the size of the second enclosure 14. (A similar modification of the first enclosure 12 was previously described.)

The relative positionings of the first enclosure 12 and second enclosure entry mouth 18 in the embodiment of FIGS. 1, 2, and 3 (and 4) offers the advantage that when the fastening clip 10 is hung and made to depend from the wire 20 by the first enclosure 12 (or more precisely, the closely bent arcuate section 30), the second enclosure entry mouth 18 is more upwardly oriented to lessen the probability of the plant member 22 slipping from out of the second enclosure 14.

Figure 5:
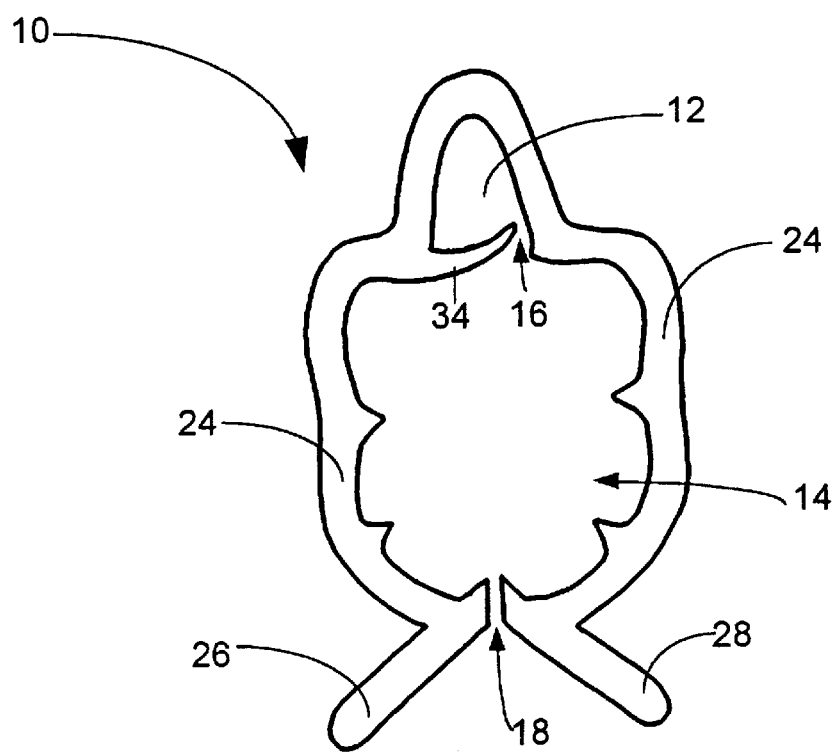
FIG. 5 is a further alternative embodiment to the fastening clip of FIG. 1 in which the first enclosure is located opposite the mouth of the second enclosure.
Figure 6:
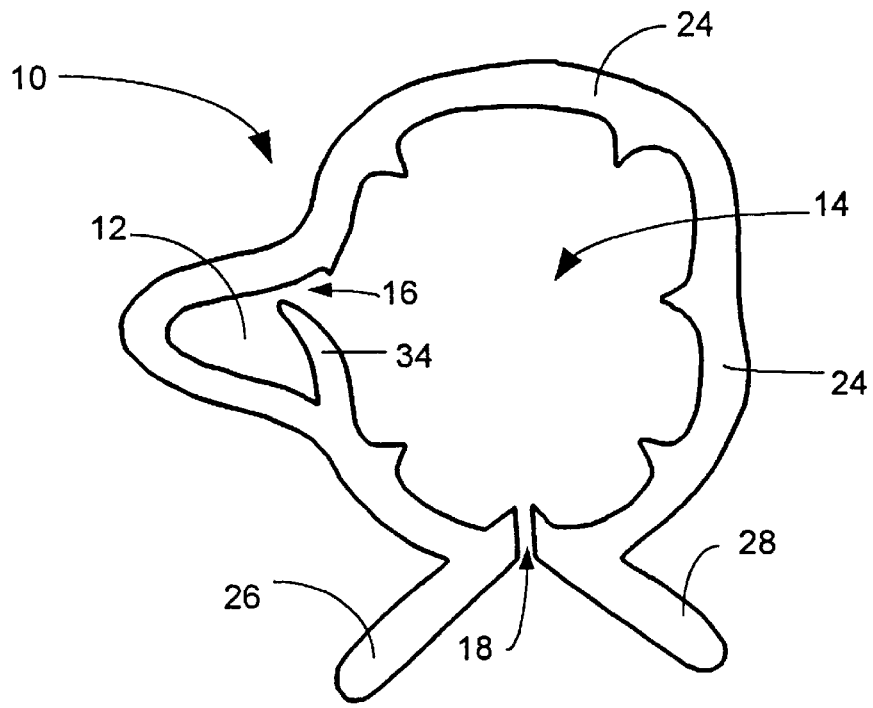
FIG. 6 is a yet a further alternative embodiment to the fastening clip of FIG. 1 in which the first enclosure is located at an intermediate position along the clip wall.
Figure 7:
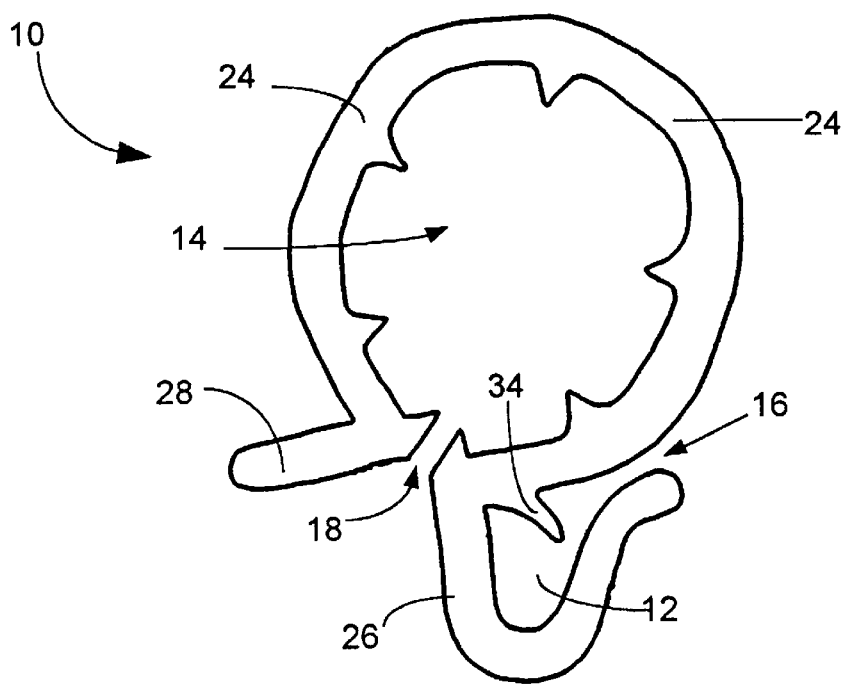
FIG. 7 is still a further alternative embodiment to the fastening clip of FIG. 1 in which the first and second enclosures are not in open communication with one another.

As shown in the alternative embodiments of FIG. 5 and 6, however, the first enclosure 12 may be situated at a location more distant from the second enclosure entry mouth 18. In this case when the clip 10 is attached to the wire 20 via the first enclosure 12, the second enclosure entry mouth 18 is more downwardly directed in the case of the embodiment of FIG. 5, where the first enclosure 12 is located opposite the second enclosure entry mouth 18. Alternatively, it may be more laterally directed, as in the case of the embodiment of FIG. 6, where the first enclosure 12 is situated at an intermediate location. In these embodiments, the small enclosure 12 is distinct from the first and second legs (26 and 28) and therefore those legs (26 and 28) are seen to be identical in the drawings. As indicated, these embodiments may be less favored due to potentially greater possibility of slippage of the plant member 22 from the fastening clip 10 due to a variety of factors (e.g., excessive growth of the plant member 22, rough handling of the plant, loss of resiliency of the clip 10 over time, etc.).

It would be apparent that other variations might exist upon the inventive concept of a fastening clip 10 that affords dual, resilient, partial enclosures. Closely related to the variations already described is the embodiment of FIG. 7. In this embodiment, unlike those previously described, there are provided first and second enclosures (12 and 14) which are not in open communication with one another. Thus, to position the wire 20 (not shown) within the first enclosure 12 does not require that the wire 20 be passed first through the second enclosure entry mouth 18 of the second enclosure 14. This design is not quite as neatly compact, however, as the previously described embodiments and may be prone to accidental disengagement from the wire 20 during mechanical harvesting.

Figure 8:
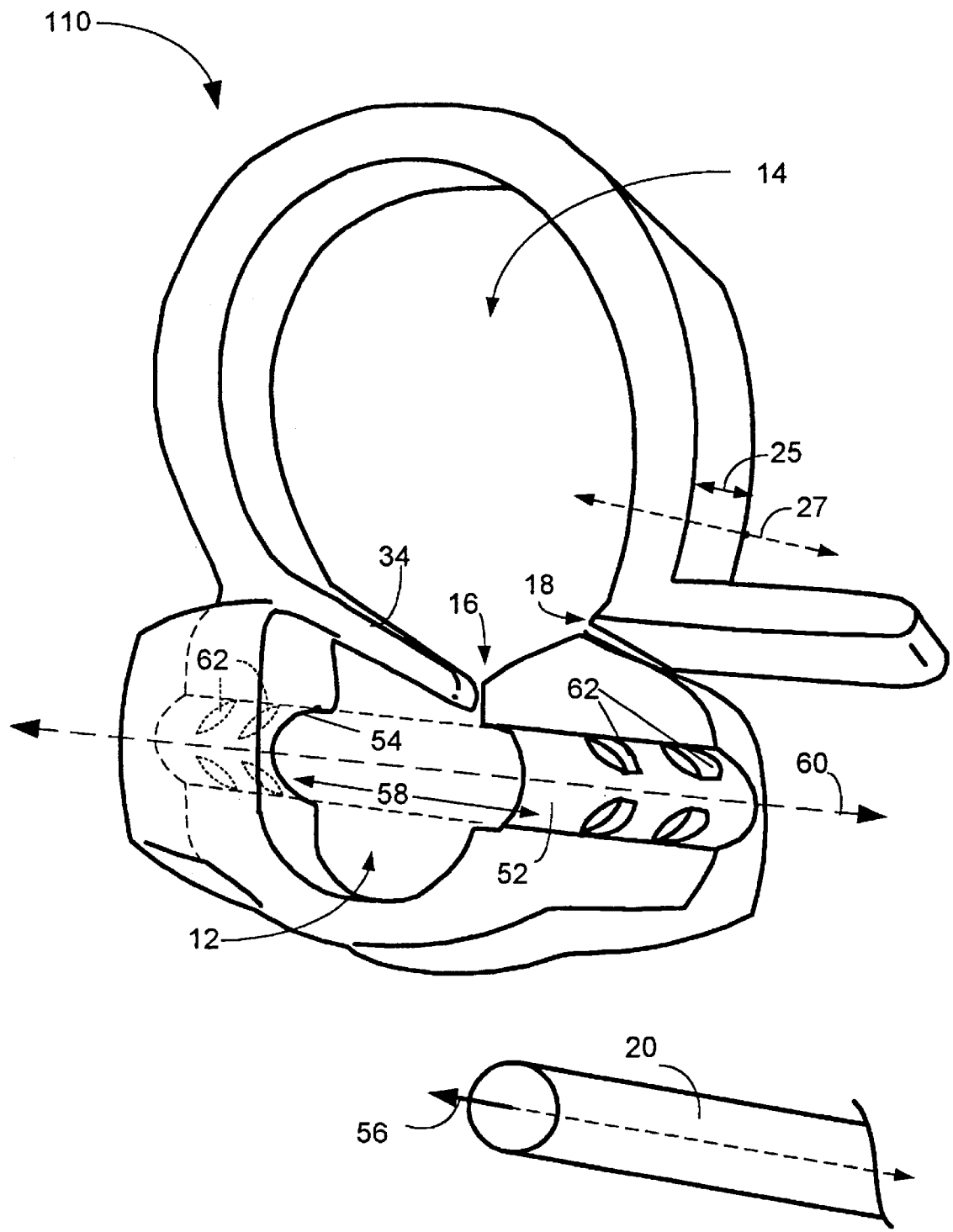
FIG. 8 is a perspective view of another alternative embodiment of the fastening clip, containing traverse wire notches.
Figure 9:
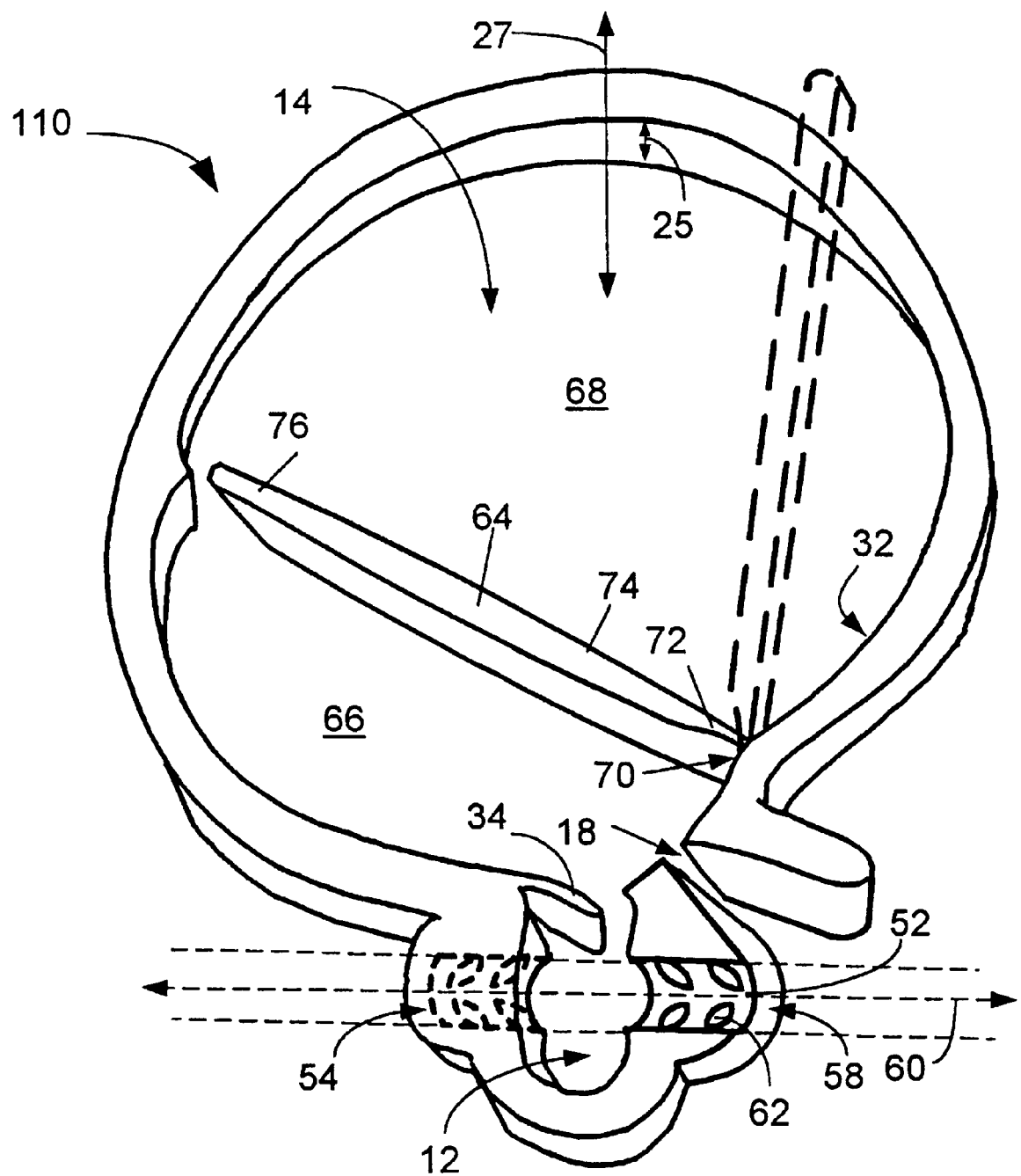
FIG. 9 is a perspective view of another alternative embodiment of the fastening clip, containing transverse wire notches.

Other embodiments of the present invention are shown in FIGS. 8 and 9. These embodiments include a channel having an axis that is transverse to the earlier established height axis for receiving a wire support. These embodiments which have this feature in common will be referred to as transverse clips 110. FIG. 8 shows the smaller of two embodiments which have a first transverse notch 52, and a second transverse notch 54 for receiving a wire 20 and securing the clip 110 laterally upon the wire 20. The wire 20, having a longitudinal axis 56, passes through the second enclosure entry mouth 18 of the second enclosure 14 and into the first enclosure entry mouth 16 of the first enclosure 12. Transverse notches 52 and 54 are aligned to form a wire channel 58 having a transverse wire channel axis 60 containing a number of retaining barbs 62. When the wire 20 has passed into the first enclosure 12, it is turned at right angles so that the wire axis 56 aligns with the wire channel axis 60. The wire 20 is pressed into the transverse notches 52, 54 and the retaining barbs 62 are deflected away from the wire channel axis 56. The retaining barbs 62 have sufficient coefficient of friction with respect to the wire 20 that the clip 110 is discouraged from movement along the direction of the wire axis 56. Thus the clip 110 remains in place on the training wire 20. The clip may also have an arm 34 to further retain the wire 20 in the first enclosure 12. Although not shown in this figure, there may be gripper protrusions 46 on the clip inner walls 32, as discussed above. The plant member 22, also not shown, may be inserted into the second enclosure 14, as described above.

Alternately, the wire 20 can be passed into the first enclosure 12, but not snapped into the wire channel 58 until after the plant member 22 has been inserted, in order to fix the clip 110 position to better direct the plants' growth.

FIG. 9 shows a larger clip 110 which includes the same feature of transverse notches 52, 54 to form a transverse wire channel 58 as shown in FIG. 8. It also optionally has retaining barbs 62, and an arm 34. The support wire 22 (not shown) is attached in the same manner as described above pertaining to FIG. 8. This embodiment also has an additional feature of an enlarged retaining arm 64 attached to the inner surface of the clip wall 32. This retaining arm 64 acts to divide the second enclosure 14 into an inner enclosure portion 66 and an outer enclosure portion 68, "inner" and "outer" being designated relative to proximity to the second enclosure entry mouth 18. A young plant stem such as a young apple tree stalk is inserted into the inner enclosure portion 66 through the second enclosure entry mouth 18. The retaining arm 64 is made of flexible material of an appropriate stiffness and thickness that it can act as a gentle spring to hold the stem in place. As the plant grows larger and the diameter of the stalk increases, the retaining arm 64 is forced to pivot farther and farther about the pivot point 70 into the outer enclosure portion 68, followed by the stem diameter. The retaining arm 64 is also preferably provided with a thinner portion 72. The width of this portion is reduced for only a fraction of the overall thickness of the retaining arm 64, and only applies to a portion of the top face 74 of the retaining arm 64 near the pivot point 70. This differential thickness of the arm 64 allows the retaining arm 64 to twist slightly as the arm 64 is made to rotate. The result is that the tip 76 of the retaining arm 64 rises out of the plane of the clip walls 24 more and more as it rotates, until the tip 76 clears the height 25 of the clip inner wall 32. As shown in dashed lines, the arm 64 continues to rotate beyond the point where it otherwise would have been stopped by contact with the inner wall 32. Even after the plant's diameter has grown to fill the second enclosure 14, further growth is still not restricted. The clip 110 is able to flex, and the second enclosure 14 can enlarge even further to accommodate the plant's growth. By this time, the plant has likely achieved enough independent rigidity that support is no longer necessary.

Figure 10:
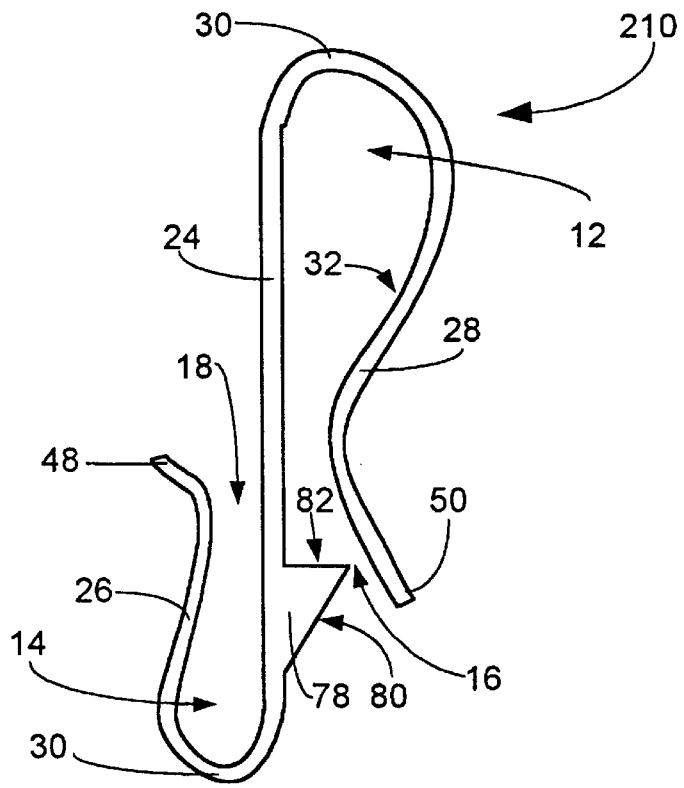
FIG. 10 is a side plan view of a still further alternative embodiment of the fastening clip which has been configured to attach to a trellis.

FIG. 10 illustrates another preferred embodiment of the present invention which will be designated by 210. Once again, where possible, element numbers will be named by their corresponding earlier designations. This clip 210 is designed to be used with a trellis. The clip 210 again has a first enclosure 12 with an opening 16 and a second enclosure 14 with an opening or second enclosure entry mouth 18 leading to it. These enclosures are once again formed by an integral clip wall 24. The clip 210 has an inner surface 32, two arcuate sections 30, a first leg 26 and a second leg 28, which terminate respectively in first leg distal end 48, and second leg distal end 50. The clip wall 24 near the first enclosure entry mouth 16 of the first enclosure 12 includes a triangular key 78 having a ramp face 80 and a flat notch face 82.

Figure 11:
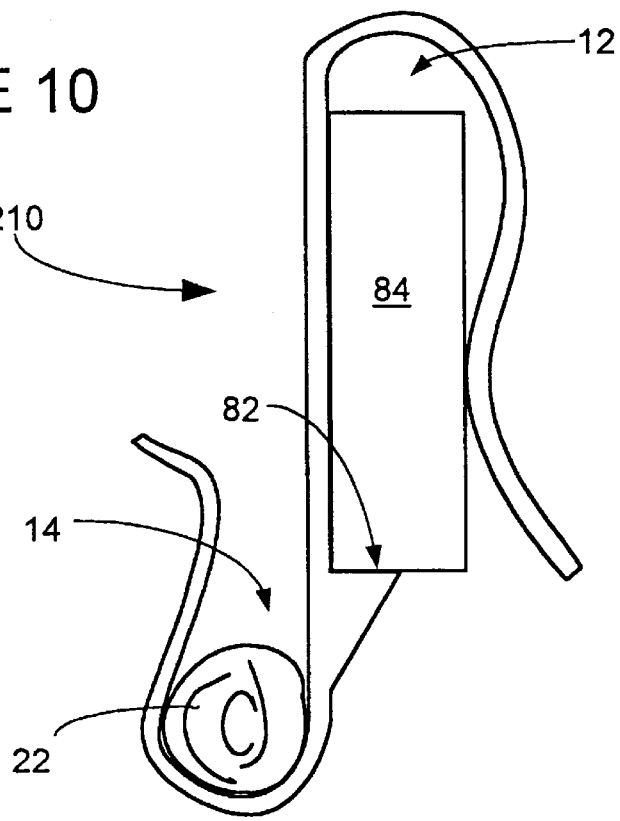
FIG. 11 is a side plan view of a still further alternative embodiment of the fastening clip which has been configured to attach to a trellis, showing its attachment to the trellis.

FIG. 11 illustrates the use of the clip 210. A trellis is generally made from strips of wood or wood lath. A trellis thus differs from a wire as an attachment site by typically being of greater width and thickness than a wire. Consequently, a larger first enclosure is required, and in this preferred embodiment, the relative sizes of the first enclosure 12 and the second enclosure 14 are reversed, compared to earlier embodiments. The first enclosure 12 is used to attach the clip 210 to the trellis 84 and the second enclosure 14 is once again used to confine the plant material 22. Referring now also to FIG. 10, as the clip 210 is fastened over the trellis 84, the trellis 84 enters the first enclosure entry mouth 16, and passes over the ramp face 80 of the key 78. The trellis 84 also contacts the inner surface 32 of the clip wall 24 near the second leg distal end 50 causing it to pivot outward as the trellis 84 enters the first enclosure 12. When the trellis 84 has passed completely within the enclosure 12, the spring action of the second leg 28 grips the trellis 84 as it rests upon the flat notch face 82 of the key 78. The flat notch face 82 thus prevents the trellis 84 from slipping out of the first enclosure 12. The plant member 22 is then introduced into the second enclosure 14 through the opening 18, and retained in a manner similar to that described above. Of course, it will be understood that the plant member 22 may be clipped first and then the clip 210 attached to the trellis 84 afterwards. For plants of larger diameter, it is also possible that the second enclosure 14 could actually be quite large, and perhaps even bigger than the first enclosure 12 that holds the trellis 84.

The trellis 84 can still be removed by prying the second leg 28 open by grasping the second leg distal end 50 and spreading it apart enough that the trellis 82 can be disengaged from resting on the flat notch face 82.

Although not shown here, the second enclosure 14 could also be configured with gripper protrusions, as in some of the previous preferred embodiments.

In addition to the above-mentioned examples, it is to be understood that various other modifications and alterations with regard to the types of materials used, their method of joining and attachment, and the shapes, dimensions and orientations of the components as described may be made without departing from the scope of the invention.

INDUSTRIAL APPLICABILITY

The fastening clip 10 (and the various embodiments described) of the present invention is designed to be used in viticulture and any horticulture generally where it is desired that plants be supported or trained upon training wires or trellises, or the like, to promote an optimal growth pattern and/or efficient harvesting of borne fruit or flowers. Agriculture that deals in this type of harvest generates billions of dollars of produce each year, and involves the cultivation of millions of plants. Each of these plants typically requires application of multiple fasteners to secure the plant members to the support devices. Time and labor involved in this activity accounts for a good fraction of total labor costs, as this function is generally done manually. Thus any device which can speed the attachment of these millions of fasteners, or which makes replacement of them necessary less often, can be expected to produce huge savings in time and money.

Use of the fastening clip 10 is simple. As used in viticulture, a typical use of the fastening clip 10 in conjunction with a support structure portion 19 such as a training wire 20 might be as follows: one or more clips 10 are initially attached by the worker to the wire 20 in the general location desired by pushing a clip 10 onto the wire 20 so that the wire 20 passes through the second enclosure entry mouth 18 and then forcibly through the first enclosure entry mouth 16. At this point, the clip 10 will be capable of hanging freely from the wire 20 and cannot be accidentally removed. (Typically, four clips 10 will be used per vine.)

While holding the fastening clip 10, the worker then pushes the plant member 22 through the second enclosure entry mouth 18 and into the second enclosure 14, the second enclosure entry mouth 18 resiliently opening and closing in the process. If the plant member 22 is not immediately oriented as desired, the worker may pull the first and second legs (26 and 28) apart and rotate the plant member 22 to the proper direction. The plant member 22 is held securely and closely against the wire 20, and is also not permitted to rotate within the clip 10 because of contact by the gripper protrusions 46.

The attachment of the plant member 22 to the training wire 20 is extremely expeditious compared to conventional methods. Further, unlike known tying methods, replacement of the fastening clips 10 is not expected to be needed but once every several years because the clip 10 has the ability to expand with the growth of the plant member 22. (The plastic material used for the clip 10 is expected to have a several-year life expectancy before substantially degrading.) Thus, there is a tremendous labor and materials savings in the vineyard from the first installation, which compounds beginning the second year, since the clips 10 will not need to be replaced on an annual basis as is generally necessary with the conventional methods.

The fastening clip 10 is equally suited for use with other plants as well as for training and/or support purposes. With larger shoots or branches, such as those found with apple trees, the clip 10 is simply made to be corresponding larger.

In the preferred embodiments 110 in which the final alignment of the plant member 22 is transverse to that of the wire 20, the wire is introduced through the second enclosure entry mouth 18 into the second enclosure 14, and then through the first enclosure entry mouth 16 into the first enclosure 12. At this point, the wire 20 can be rotated so that the axis of the wire 56 aligns with the wire channel axis 60, and the wire 20 is snapped into the wire channel 58. Retaining barbs 62 in the wire channel 58 anchor the clip 110 on the wire 20 and prevent lateral movement along the wire 20. The plant member 22 can then be pushed through the second enclosure entry mouth 18 and into the second enclosure 14, as before. Alternately, the wire 20 can be passed into the first enclosure 12, but not snapped into the wire channel 58 until after the plant member 22 has been inserted, in order to fix the clip 10 position to better direct the plants' growth.

For the embodiment 110 which is to be used for plants with larger expected stalk diameter, the wire 20 is attached as above, but the plant stalk 22 is introduced into the inner enclosure portion 66 and held in position by the enlarged retaining arm 64. As the diameter of the plant stalk 22 increases, the retaining arm 64 is pushed further and further into the outer enclosure portion 68. The retaining arm 64 is designed with a thinner portion 72 which allows the retaining arm 64 to rise out of the plane of the clip 110 as it rotates, rising eventually until its tip 74 clears the height 25 of the clip wall 24. Thus the retaining arm 64 is not stopped by contact with the inner surface of the clip wall 32, and the plant member 22 is allowed to reach the full size of the second enclosure 14, by which time it may be rigid enough to require no further support. The clip 110 is thus useful for several seasons of growth without requiring replacement.

The clip embodiment 210 which is to be used with stakes or wooden trellises is designed for the trellis 84 to be inserted into the opening 16 of the first enclosure 12, by pushing past the ramp face 80 of a retaining key 78. As the trellis 84 is pushed into the enclosure 12, the second leg 28 is resiliently spread apart. When the trellis 84 has passed completely within the enclosure 12, the spring action of the second leg 28 grips the trellis 84 as it rests upon the flat notch face 82 of the key 78. The flat notch face 82 thus prevents the trellis 84 from slipping out of the first enclosure 12. The plant member 22 is then introduced into the second enclosure 14 through the opening 18, and retained in a manner similar to that described above. Alternately, the plant member 22 can be captured first and then the clip 210 can be attached to the trellis 84.

The clips 10, 110, and 210 of the present invention can be easily manufactured from common plastics using conventional molding or extrusion techniques. Their integral, one-piece construction makes fabrication convenient. The mostly self-enclosed nature of the clips 10, 110, 210 provides fewer awkward protrusions which can entangle with others, so collection and reuse of the clips 10, 110, 210 is much facilitated.

For the foregoing reasons, and for numerous others as set forth previously herein, it is expected that the industrial applicability and commercial utility of the present invention will be extensive and long lasting.

What is claimed is:

1. A resilient fastening clip for attaching a plant member to a portion of a support structure, comprising:

a clip wall creating a first enclosure and a second enclosure with are integrally fashioned from said clip wall, the clip wall having an inner face and a height;

said first enclosure having a first enclosure entry mouth which may be resiliently spread open to allow entrance of a support structure portion, and which closes after insertion to prevent outward passage of said support structure portion;

said second enclosure having a second enclosure entry mouth which may be resiliently spread open to allow entrance of a plant member, and which closes after insertion to prevent outward passage of said plant member, the second enclosure further comprising an enlarged retaining arm which divides the second enclosure into an inner enclosure portion and an outer enclosure portion, said retaining arm being attached to said inner surface of said clip wall at a pivot point, said retaining arm being resiliently rotatable about said pivot point as said plant member increases in diameter, said inner enclosure portion being accessible through said enclosure mouth, such that a plant member is introduced into said inner enclosure portion and is resiliently held between said retaining arm and said inner surface of said clip wall, said retaining arm having a retaining arm tip and a thinner portion proximate to said pivot point, said thinner portion allowing said retaining arm tip to rise above the height of the clip wall as said retaining arm pivots wherein the rotation of the retaining arm tip is not constrained by contact with said clip wall inner surface.

\* \* \* \* \*